3,144,041
MILK HANDLING CART
Charles R. Werner and Frank Charles Werner, Grand Rapids, Mich., assignors to Werner Machinery Company, Grand Rapids, Mich., a corporation of Michigan
Filed Mar. 13, 1958, Ser. No. 721,257
8 Claims. (Cl. 137—355.12)

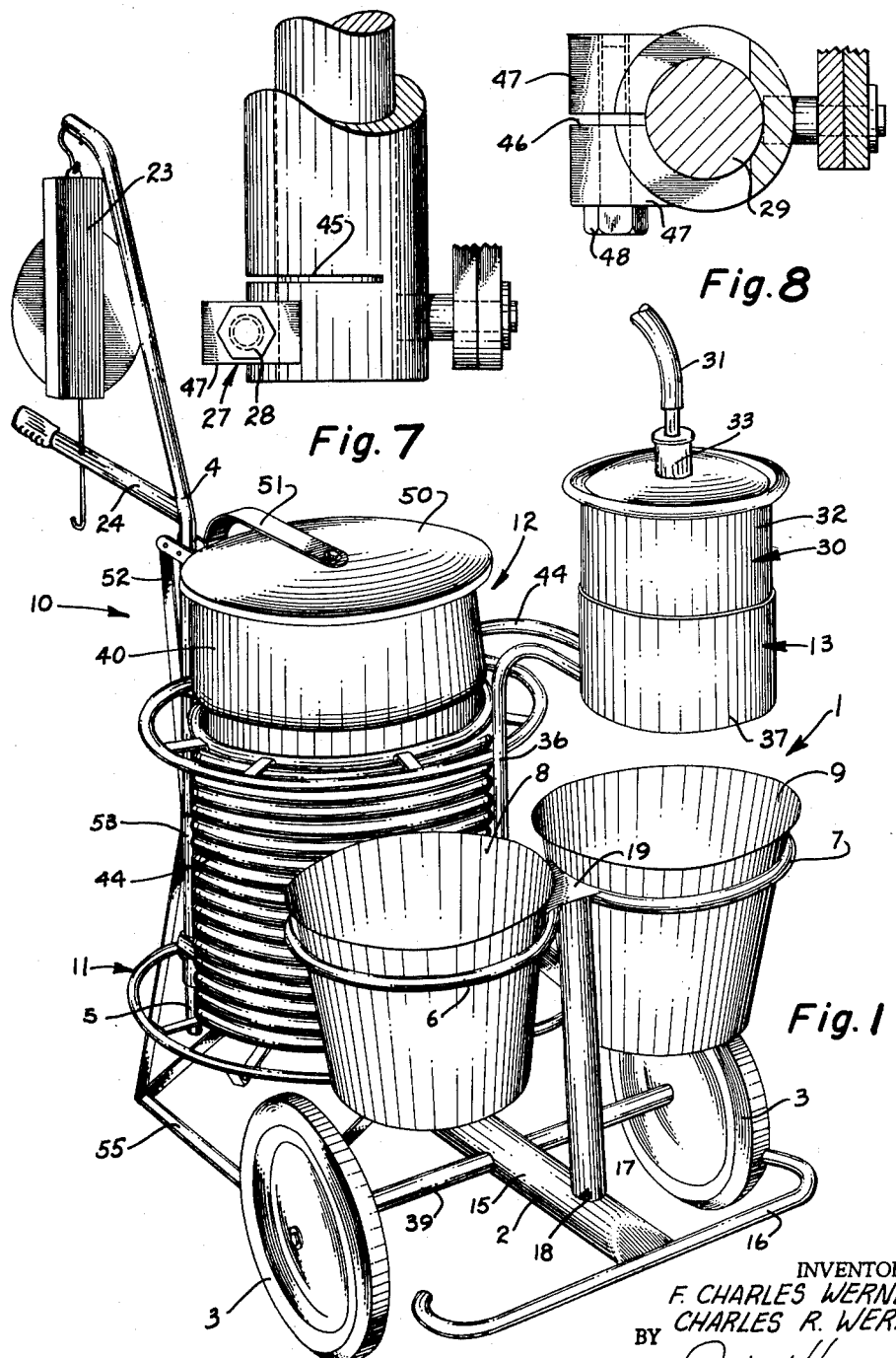

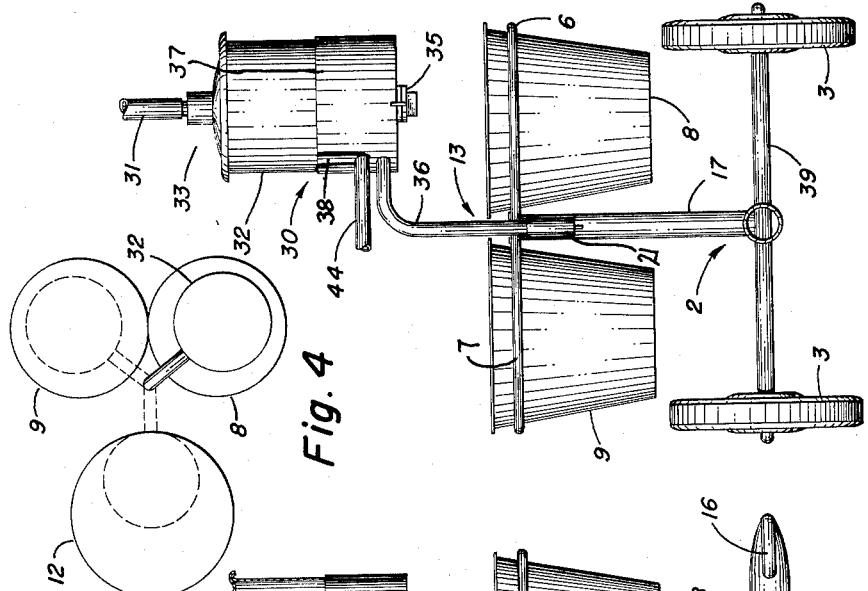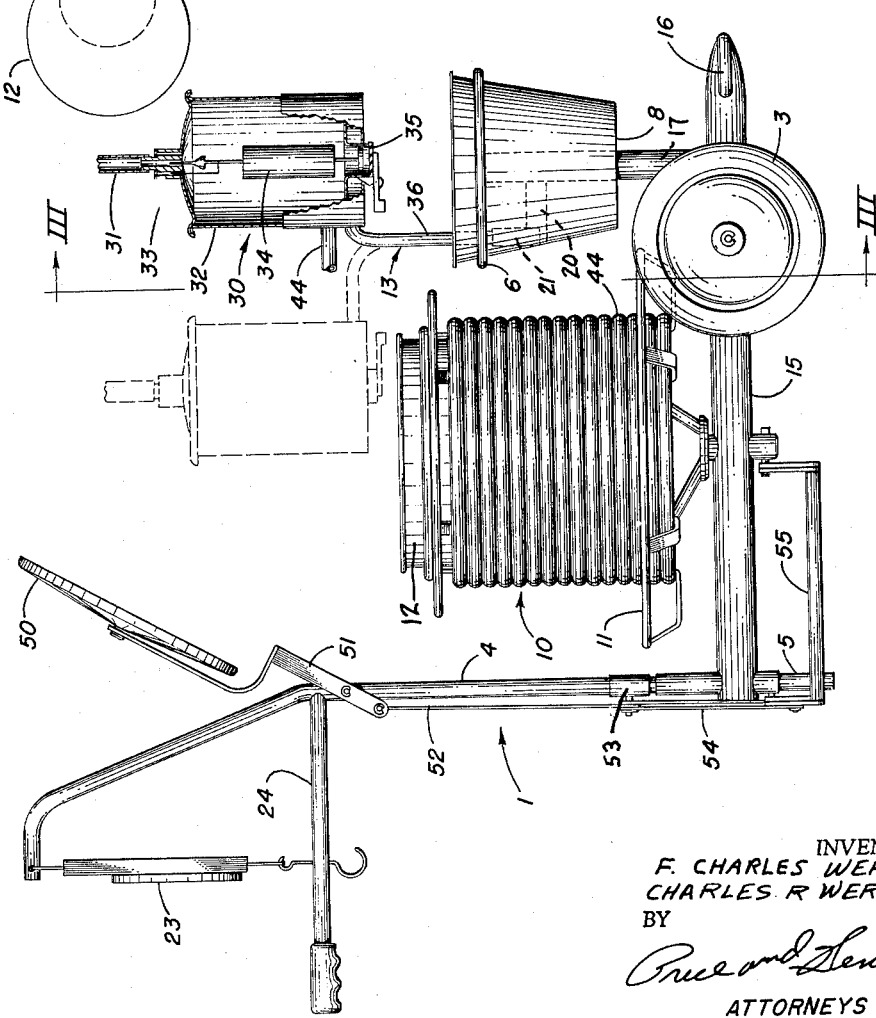

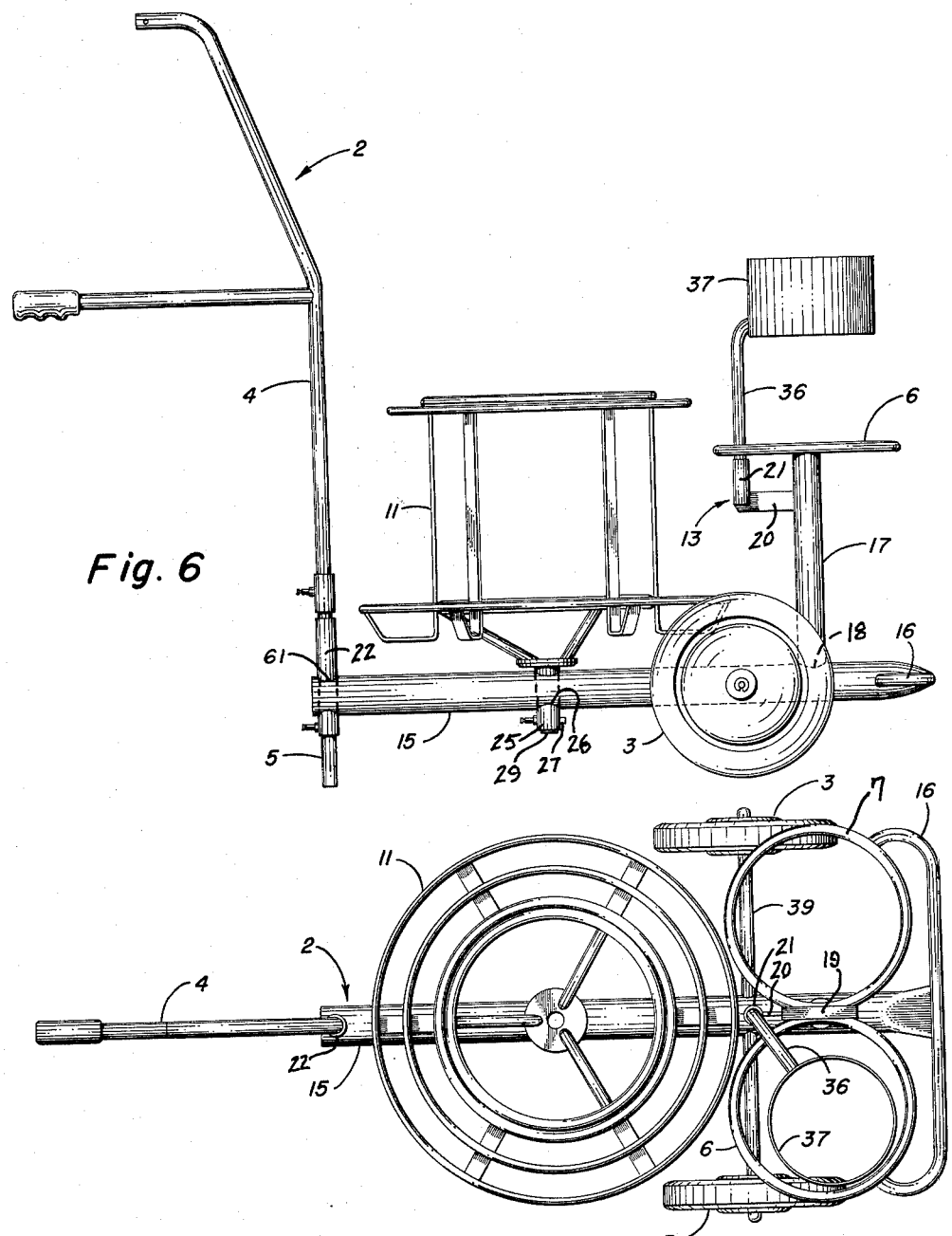

This invention relates to a milk handling cart and more particularly to a cart construction for moving milk from the parlor or barn to the milk house where the milk is stored in coolers.

Various devices and apparatus have been developed for enhancing the efficiency of handling milk. Many types have been proposed but the expensiveness of these systems and the unwieldly size and cumbersomeness of the apparatus has made them impractical.

Milking systems are in existence which consist of a means for transporting milk from the milking barn through a flexible hose to the milk house by use of the same vacuum line provided for the milking. The application pertains to a device for cleaning such milking apparatus.

An object of this invention is to provide a cart for more expeditiously transporting milk from the staunches in the barn to the milk storage containers in the milk house.

A further object of this invention is to provide a milk handling cart of novel construction which facilities more expedious and sanitary handling of milk and easier cleaning and sterilizing of the equipment used in milking and transporting the milk.

Still another object of this invention is to afford to the ordinary milk farmer a milk handling cart of novel construction which has the advantages of speed in placing the entire system into operation and the speed in operating the system.

Another object of this invention is to facilitate a simple, sanitary and low cost method of moving milk from the parlor or barn to the milk storage house.

A further object of this invention is to provide apparatus for simplifying the cleaning and sterilizing of the equipment by permitting the recirculation of detergent, sterilizer, and rinse water through the system which is entirely mounted on the cart. This apparatus permits salvaging of the same sterilizer and water for use in cleaning and sterilizing the milking apparatus and cows' udders during the milking operation.

Other objects of this invention will become obvious upon reading the following specification in conjunction with the accompanying drawings, wherein:

FIG. 1 is a side elevational, perspective view of the overall cart.

FIG. 2 is a side elevational view of the cart with the strainer removed.

FIG. 3 is a cross sectional view of the cart taken along the plane III—III of FIG. 2.

FIG. 4 is a plan view of a portion of the cart illustrating the three different positions in which the bracket is adapted to support the pump and releaser unit which ordinarily is used for transporting the milk from the tank on the cart to the milk house.

FIG. 5 is a plan view of a portion of the front frame with the buckets removed thus showing the construction of the frame in more detail.

FIG. 6 is a sectional view of the frame taken along the plane VI—VI of FIG. 5.

FIGS. 7 and 8 are fragmentary views of the tension brake for the reel and tank assembly.

Briefly this invention relates to a cart apparatus for handling milk comprising a cart frame supporting at least two buckets and a tank in which the milk is poured from the milkers. The two buckets are provided to carry warm water and a sterilizer solution required for cleaning the milking apparatus and the udders of the cows. The frame supports a bracket adapted to removably support the pump and releaser unit which is normally located in the milk house for drawing the milk from the tank on the cart through a conduit and dumping it into a storage container. In accordance with this invention when the entire apparatus is to be cleaned, the pump and releaser unit is supported on the bracket which is movable to positions over each of the buckets and over the tank. This construction permits the cleaning and sterilizer fluid to be recirculated through the entire system as the pump and releaser unit draws such fluid from the tank and then dumps it back into the tank. This arrangement also permits the cleaning and sterilizing solutions finally to be dumped into each of the buckets for use in the milking operation.

Another aspect of this invention includes the cart frame comprising a single centrally elongated frame member extending longitudinally of the frame. A wheel axis extends transversely of and is connected to one end of the elongated frame member for supporting a pair of wheels making the cart mobile. At one end is also located a pair of rings supported on the frame for receiving a pair of buckets. A tank is rotatably mounted at the central portion of the elongated frame member. This construction provides a simple but strong, stable and well balanced cart.

Referring to the drawings, reference numeral 1 designates the overall cart including a frame 2 supported on the wheels 3 at the front of the frame. The frame has an upright handle 4 at its rear with a brake foot 5 at its lower end directly resting on the floor to prevent the cart from rolling away. Supported on the front end of frame 2 are two circular rings 6 and 7 supporting buckets 8 and 9. Rearwardly of the rings is a reel and tank assembly 10 which includes the reel 11 and the tank 12. Also pivotally mounted on the frame between rings 6 and 7 and the reel and tank assembly is the bracket 13 for supporting a pump and releaser mechanism 30 of the type like that shown in application Serial No. 729,088, filed April 17, 1958 and entitled Vacuum Operating Mechanism for a Pumping and Releasing System (now United States Patent No. 3,008,450). This arrangement of the pump and releaser unit bracket and the construction of the frame form patentable features of this invention.

The skeleton frame of this invention (FIGS. 5 and 6) includes an elongated central frame member 15 having a bumper 16 at its front end. This bumper has curved ends and is secured at the central portion to the front end of the elongated frame member 15 which is pinched forming an elongated socket in which the bumper 16 is welded. A post 17 extending vertically upwardly from the frame member 15 is secured in opening 18 located a short distance rearwardly from the bumper. This securement is by welding or any other suitable means. The post 17 extends upwardly a substantial distance and has secured at its top end a block 19 to which the rings 6 and 7 are attached. The rings 6 and 7 are rigidly secured to the block 19 and the post 17 so that they are located in a horizontal plane for receiving a pair of buckets (not shown in FIGS. 5 and 6) side by side on each side of the central frame member 15.

Secured to the post 12 below the rings 6 and 7 is a plate 20 extending rearwardly and having secured to its end the cylindrical socket 21. The socket 21 has a slot in its lower end receiving the edge of the plate 20. It is secured to the plate by welding or any other suitable means. This socket 21 is provided for rotatably receiving the pump and releaser unit bracket 13 which will be described in more detail hereinafter.

The rear end of the frame member 15 has the aligned opening 21 receiving a handle sleeve 22 rigidly welded in the opening 61. The sleeve 22 rotatably receives the handle 4 which extends downwardly to the surface on which the cart is supported providing a brake foot 5 to prevent the cart from rolling away.

The top of the handle 4 is bent rearwardly and supports a scale 23 the hook of which extends through the elongated handle 24 so that when the pail is placed on the hook it is prevented from swinging.

Between the sleeve 22 of the frame and the upstanding vertical post 17 is the bearing 25 extending through and secured to the opening 26 of the frame member 15. This bearing has a tension brake 27 at its lower end (FIGS. 7 and 8) comprising a lateral slit 45 located a short distance above the lower end of bearing 25 and a longitudinal slit 46 extending from the lower bearing end to slit 45. On each side of slit 46 are the blocks 47, one being tapped and the other bored for receiving a screw 48. The screw when tightened draws the walls of the lower end of the bearing together to frictionally engage the shaft 29. This prevents the reel from freely coasting and creates tension on the hose or conduit when it is pulled off the reel.

The shaft 29 of the reel and tank assembly is rotatably mounted in the bearing 25. The entire construction of the reel and tank assembly is shown and described in more detail in copending application Serial No. 718,626, filed Mar. 3, 1958, and entitled Milk Handling Apparatus (now United States Patent No. 3,088,483). It is not believed necessary to describe this structure in complete detail since the detailed features of the tank and reel assembly do not form a part of this invention.

The tank 12 is connected to the hose 44 which is wound on the reel 11, surrounding the tank. The other end of hose 44 is connected to a pump and releaser mechanism or unit shown supported by the bracket 13 (FIGS. 1 and 2). This mechanism or unit 30 shown by the cutaway section of FIG. 2 is also connected to the vacuum line 31. Between the vacuum line and the container 32 of the unit is a valve 33 which controls communication between the inside of container 32 and the vacuum line 31 and also communication between the container 32 and the atmosphere. The valve 33 in one position closes off communication between the atmosphere and the container 32 and in a second position shuts off communication between the container 30 and the vacuum line 31. This valve is controlled by the float 34. The bottom of container 32 has a pivoted trap door 35 which opens when liquid in the container is under atmospheric pressure. However, when the container 32 is under the pressure of the vacuum line 31 the trap door 35 is held closed.

The float 34 in controlling the valve 33 controls the opening of the trap door 35. As a result periodically when the valve 33 is open to atmospheric air liquid in the container 32 is dumped through the trap door 35. In a typical cycle of operation of unit 30 the milk is first drawn from tank 12 through conduit 44 into the container 32 by the vacuum in line 31. As the milk in the container 32 reaches a predetermined level the float 34 rises actuating valve 33 and closing off communication with the vacuum line 31 and opening communication with the atmosphere. This causes the trap door 35 to drop and the liquid in the container to be dumped out of the bottom of the container. A more detailed description of the operation units of this type is described in copending application Serial No. 729,088, filed Apr. 17, 1958 (now United States Patent No. 3,008,450).

One aspect of this invention takes advantage of the operation of unit 30 by which the cleaning and sterilizing fluid can be recirculated through the entire system. Further, it provides for the salvaging of these fluids for use in the cleaning of the milking apparatus during the milking operation. For this purpose we provide a bracket 13 which includes an inverted L-shaped arm 36 having its lower end rotatably mounted in the socket 21. At the other end of the arm is located a cup 37 having a slot 38 on one side for receiving the hose connection between the unit 30 and hose 44. The arm 36 and cup 37 are of the proper size and shape so that when the arm is rotated in socket 21 the unit 30 can be located over tank 12 (when strainer 40 is removed, FIG. 2) or over either of the buckets 8 or 9 as illustrated by FIG. 4. The purpose for this will be disclosed under "Operation."

As shown by FIGS. 1 and 2 this cart has a treadle operated mechanism for lifting the cover 50. This mechanism includes an arm 51 operatively connected to the lever 52, collar 53 and lever 54 all of which are actuated by the treadle 55 located on each side of the frame. By this mechanism, one using the cart can step on the treadle and easily lift the cover while using his hands for pouring the milk from the milker.

The entire cart is mounted on the wheels 3 by means of an axle 39 extending through the frame member 15 a short distance rearwardly of the post 17.

*Assembly*

The assembly of this apparatus is quite simple because of the relatively few component parts. The frame is first assembled by properly forming and shaping the frame member 15 for mounting the bumper 16, standing post 17, axle 39 and wheels 3, bearing 25, and handle sleeve 22. The block 19, rings 6 and 7, plate 20 and socket 21 are then attached to the post 16. Next, the handle 4, the treadle operated cover actuating mechanism, the reel and tank assembly 10, and the pump and releaser unit bracket are all assembled along with the wheels. This completes the assembly in a relatively easy manner.

*Operation*

This cart is generally stored in the milk house, parlor or barn. Before using it, it is necessary to rinse and sterilize the apparatus even though it has been thoroughly washed after its last use. This is easily accomplished by filling the bucket 8 with hot water and the bucket 9 with a disinfectant or sterilizing solution such as a chlorine solution. The apparatus is first rinsed with the warm water in bucket 8 by pouring that water into the tank 12. Unit 30, which is generally stored in the cup 37, is then connected to the vacuum line 31 and positioned over the tank by pivoting it to that position. The vacuum causes the warm water to be drawn through the hose or conduit 44 into the container 32. As the warm water in the container 32 reaches a predetermined level the valve 33 shuts off communication with the vacuum line 31 and opens communication with the atmosphere. This causes the trap door 35 to open dumping the water back into the tank. By repeating this cycle warm water is recirculated from the tank through the hose of conduit 44 into the container 32 and back into the tank.

The next step is to rotate the bracket 13 to a position over the bucket 8 so that when the water is dumped from the unit 30 it is dumped back into the bucket 8. Since only a bucket of water was poured into the tank 12 the water dumped into the bucket will empty the tank. Thus the warm water is salvaged and although such salvaging is not a tremendous savings in the cost of water it does eliminate the handling of large quantities of water and the inherent time and annoyance generally required in handling water to clean apparatus of this type.

The chlorine solution in bucket 9 is then poured into the tank 12 and unit 30 is moved to a position over the tank by rotating bracket 13. By the method previously described, this chlorine solution is recirculated through the entire system including the tank, hose, and unit 30. This is continued for a short time required to sterilize the apparatus after which time the bracket 13 is swung to a position over bucket 9 causing the disinfectant or chlorine solution to be dumped into the bucket 9. Since the chlorine solution was poured from bucket 9 into the tank, filling the bucket empties the tank and then the entire unit is cleaned and sterilized, ready for use.

When the cart is to be used the unit 30 is removed from the cup 37 and placed over the storage container in the milk house. Then the cart is pushed into the parlor or milking room and in so doing the conduit is unwound from the reel 11. When the milker is full it is brought to the cart, weighed on the scale 23 and the proper record is made after which the milk is poured into the tank 12. During this operation, the strainer 40 is on the tank for straining the milk as required by State regulations. As the milk is poured into the tank, it is drawn through the conduit 44 into the container 32 of unit 30 and in the same manner previously described, is dumped into the storage container. This is continued until the entire milking is completed.

Having completed the milking, the cart is generally pushed back into the milk house where it is to be cleaned In so doing, the conduit or hose is wound on the reel 11 and when the cart reaches the milk house the unit 30 is again placed in the cup 37. The apparatus is first rinsed with cold water which is poured into the tank 12 after removing the strainer 40 which is cleaned separately. The bracket 13 is then pivoted to a position over the tank 12 and the cold water is recirculated thruogh the entire system in the same manner as previously described, that is, the cold water is drawn into the unit 30 and dumped back into the tank. In this cleaning operation it may be desirable to use a brush in certain localities to assure that the milk is cleaned from the apparatus. After rinsing the entire apparatus with cold water then the operation is repeated with a detergent. After the detergent the entire operation is completed with a sterilizer such as a chlorine solution or any other type of disinfectant approved by the milk authorities. After the entire apparatus has been properly cleaned the unit 30 is disconnected from the vacuum line 31 and the unit stored away, the unit being very compact so that very little storage room is required.

It should be obvious from the above description that this apparatus provides a cart which is rigid, well balanced, strong and stable. Its novel construction facilitates more expeditious and sanitary handling of milk. It makes for easier cleaning and sterilization of the equipment used in milking and in transporting the milk. This cart has the advantages of speed for placing the entire system into operation. It is a low cost method of moving milk from the parlor or barn to the milk storing house, the apparatus being available to the average milk producer rather than only to the extremely large operators who before this time were the only ones that could afford milk transporting equipment of this type. This invention simplifies the cleaning and sterilizing of the equipment by permitting the recirculation of the detergent and sterilizer and rinse water through the entire system. It permits salvaging of the warm water and chlorine water required in the milking operation. Therefore, it eliminates the handling of large quantities of water which before this time has been an annoyance. Other advantages of my invention should also be obvious from the above description.

Having described our invention it should become obvious that although we have described the various forms and modifications, alterations and other modifications are possible within the broadest aspect and spirit of this invention. Thus, these alterations and modifications should be considered as covered by this invention unless the claims by the express language state otherwise.

We claim:

1. In a milking apparatus cleaning device: a tank; a releaser unit; a hose interconnecting said tank and said releaser unit; at least one receptacle; a first support for said releaser unit; ;a second support for said receptacle, said second support positioned below said first support; and means for selectively positioning said first support and said releaser unit above said receptacle and said tank in dumping relationship therewith.

2. In a milking apparatus cleaning device: a tank; a releaser unit; a hose interconnecting said tank and said releaser unit; a pair of receptacles; a first support for said releaser unit; a second support for said receptacles, said second support positioned below said first support; and means for selectively positioning said first support and said releaser unit above said receptacles and said tank in dumping relationship therewith.

3. In a milking apparatus cleaning device: a tank; a releaser unit; a hose interconnecting said tank and said releaser unit; a pair of receptacles; a first support for said releaser unit; a second support for said receptacles, said second support positioned below said first support; said tank and said supports mounted on a cart frame; and a movable bracket connecting said cart frame and said first support, said bracket being constructed and arranged to selectively position said first support and said releaser unit in dumping relationship with said receptacles and said tank.

4. In a milking apparatus cleaning device according to claim 3, said first support comprising a ring secured to said bracket and said second support comprising a pair of laterally spaced rings secured to said cart frame.

5. In a milking apparatus cleaning device: a cart frame; a tank mounted on one end of said cart frame; a releaser unit; a hose interconnecting said tank and said releaser unit; a pair of receptacles; a first support for said releaser unit, said first support mounted on the other end of said cart frame; a second support for said receptacles, said second support supporting said receptacles in side by side relationship and below said first support; and said first support pivotally secured to said cart frame by a bracket, said bracket being constructed and arranged to selectively position said releaser unit above and in dumping relationship with said tank and said receptacles.

6. In a milking apparatus cleaning device: a cart frame; a tank mounted on one end of said cart frame; a releaser unit; a hose interconnecting said tank and said releaser unit; a pair of receptacles; a first support for said releaser unit, said first support comprising a ring; a bracket pivotally securing said first support and constructed and arranged to move said support in a horizontal plane both above said tank and the other end of said cart frame; a second support for said receptacles, said second support comprising a pair of laterally spaced rings; and said second support secured to said cart frame below said first support whereby said first support and said releaser unit may be selectively positioned above and in dumping relationship with said receptacles and said tank.

7. In a milking apparatus cleaning device: a cart frame; a tank mounted on one end of said cart frame; a releaser unit; a hose interconnecting said tank and said releaser unit; at least one receptacle; a first support for said releaser unit, said first support comprising a ring; a bracket pivotally securing said first support and constructed and arranged to move said support in a horizontal plane above said tank and the other end of said cart frame; a second support for said receptacle, said second support comprising a ring; and said second support secured to said cart frame below said first support, said bracket being constructed and arranged to selectively position said first support and releaser unit above and in dumping relationship with either said receptacle or said tank.

8. In a milking apparatus cleaning device: a cart frame including a vertical post thereon; a tank mounted on one end of said cart frame; a releaser unit; a hose interconnecting said tank and said releaser unit; a pair of receptacles; a first support for said releaser unit, said first support comprising a ring; a bracket pivotally securing said first support on said vertical post and constructed and arranged to move said support in a horizontal plane above said tank and the other end of said cart frame; a second support for said receptacles, said second support comprising a pair of laterally spaced rings; and said second support secured to said vertical post below said first support, said bracket being constructed and arranged to selectively position said first support and releaser unit above and in dumping relationship with either said receptacles or said tank.

References Cited in the file of this patent

UNITED STATES PATENTS

| | | |
|---|---|---|
| 1,596,520 | Eskholme et al. | Aug. 17, 1926 |
| 1,754,802 | Raster | Apr. 15, 1930 |
| 2,015,127 | Rieger | Sept. 24, 1935 |
| 2,560,059 | Young | July 10, 1951 |
| 2,608,951 | Kingston | Sept. 2, 1952 |
| 2,678,627 | Kingston | May 18, 1954 |
| 2,733,667 | Hill | Feb. 7, 1956 |
| 2,816,558 | Fasth | Dec. 17, 1957 |
| 2,829,657 | Bender | Apr. 8, 1958 |
| 2,878,819 | Thomas | Mar. 24, 1959 |
| 2,895,450 | Hope | July 21, 1959 |